Nov. 20, 1928.
E. A. ROCKWELL
1,692,093
VALVE FITTING FOR COMMUNICATING ENGINE CYLINDER PRESSURES
Original Filed Feb. 25, 1926
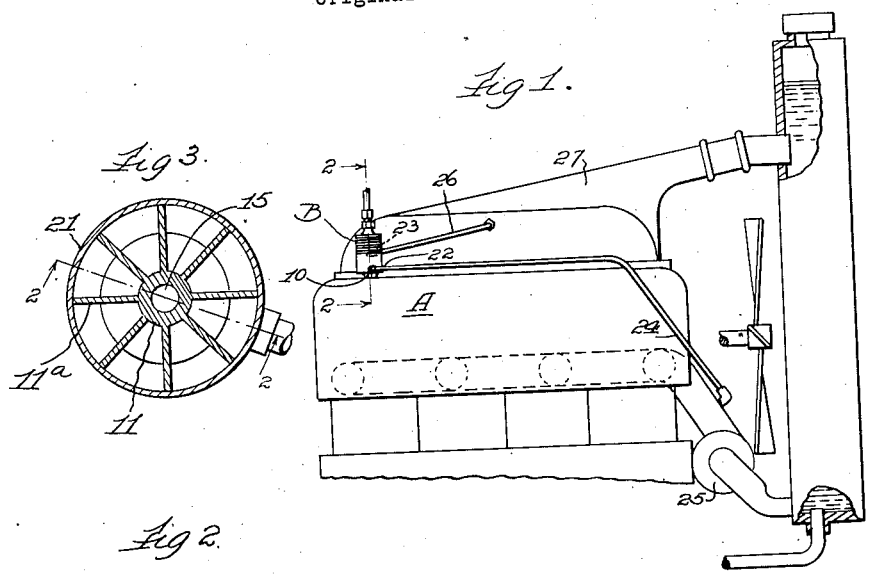
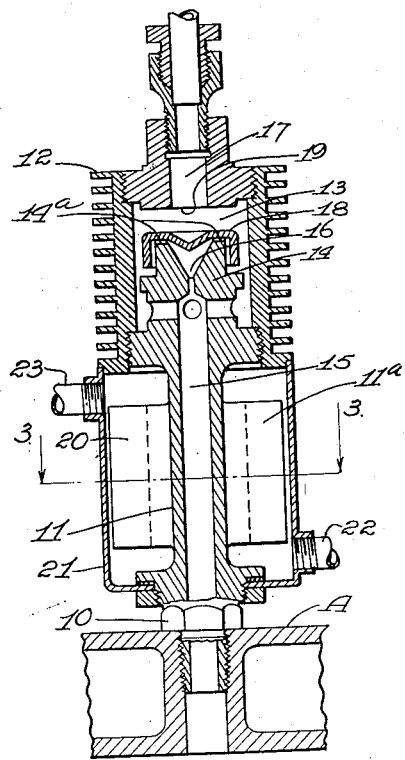
Inventor.
Edward A. Rockwell
by Burton Burton
his Attorneys Patented Nov. 20, 1928.

1,692,093

UNITED STATES PATENT OFFICE.

EDWARD A. ROCKWELL, OF LONG ISLAND CITY, NEW YORK, ASSIGNOR TO STEWART-WARNER SPEEDOMETER CORPORATION, A CORPORATION OF VIRGINIA.

VALVE FITTING FOR COMMUNICATING ENGINE-CYLINDER PRESSURES.

Application filed February 25, 1926. Serial No. 90,596. Renewed April 14, 1928.

The primary purpose of this invention is to provide an improved construction of a valve fitting and connection for communicating and governing gas pressures derived from the cylinder of an internal combustion engine for any extraneous purpose. A secondary purpose is to provide means for cooling such fitting in view of the high pressure and temperature of the engine gases tending to heat the fitting and any valve therein to a degree rendering the valve liable to be distorted by the pressure. It consists in the elements and features of construction shown and described as indicated in the claims.

In the drawings:

Figure 1 is a diagrammatic view showing the location on the engine and relation to cooling means of a fitting embodying this invention.

Figure 2 is an axial section of such fitting as at the line 2—2 on Figure 1, showing a form of valve adapted for regulating the transmission of pressure in the pressure phase of the engine cycle.

Figure 3 is a section at the line 3—3 on Figure 2.

In the drawings A represents the cylinder head of the engine. B indicates in totality a valve fitting and connection embodying this invention. The fitting, B, is designed to be screwed into the head of the engine cylinder as seen at 10. It comprises a stem, 11, and an enlargement, 12, containing a valve chamber, 13, into which a boss, 14, protrudes from the side toward the stem, and through which the passage, 15, of the stem extends to an inlet port, 16, which is situated opposite an outlet port, 17. The head of the boss, 14, constitutes a stop for a valve, 18, for which a seat is provided at 19 encompassing the outlet port, 17. The valve does not seat for completely closing the inlet port, such complete closing of that port being prevented by notches, 20, made across the head of the boss. The range of movement of the valve between the stop afforded by the head of the boss and the valve seat, 19, is short relatively to the area of the valve which is a thin metal stamping in inverted cup form of relatively light weight, the seating face of the valve being the outer or upper side of the bottom of the cup (which thus becomes a hood over the boss) with ample clearance for the gases around the margin of the cup in the valve chamber; so that the engine gases in the pressure phase of the engine cycle discharging under the inverted cup or hood, act upon the large area of the valve and with the further advantage of retention under the cup for quickly overcoming the inertia of the valve and any additional resistance to its seating movement which may be provided; whereby the valve is seated with very short delay upon the access of the pressure gases from the engine occurring at the instant of the commencement of the pressure phase of the engine cycle, during which short delay the gases pass by the valve and through the outlet port to a limited extent.

The purpose of the detail construction described is to thus limit to a small amount and to a brief instant, amounting to a small fraction of the pressure phase of the engine cycle, the passage of the gas and the transmission of its pressure to the device, of whatever sort, which is to be connected with the fitting at the outlet side thereof.

This fitting is specially designed for connecting the engine cylinder with an apparatus which may be operated by the limited pressure transmitted past the valve for any purpose auxiliary or extraneous to the functions of the engine, as a fuel feeding apparatus of any sort. But I do not limit myself in respect to the character of the apparatus served, the present invention being directed only to the adaptation of the fitting for transmitting and limiting the transmission of the pressure of the engine gases and overcoming the tendency to overheating the device by these gases.

For the last-mentioned specific purpose the fitting is desirably constructed as shown with the relatively long stem, 11, formed with relatively thin heat-radiating ribs or fins, 20, forming between them passages for the circulation of cooling fluid, the portion of the stem thus provided being desirably enclosed in a jacketing sleeve, 21, having connections as seen at 22 and 23, at the opposite limits of the circulatory passages mentioned, for inlet and outlet respectively of a cooling liquid which may be thus caused to circulate through said passages around the stem for rapidly conducting away the heat radiated and communicated from the ribs or fins. In the diagrammatic view of Figure 1, a pipe, 24, is shown leading directly from the pump, 25, which affords forced circulation of the cooling water through the engine jacket, to the inlet port connection, 22, of the jacketing sleeve, 21, and a pipe, 26, leading from the outlet connection, 23, of said jacketing sleeve to the return pipe, 27, of the water circulatory system of the engine which leads to the radiator.

It will be understood that any other convenient means of causing water circulation through the device may be employed; but it is preferred to utilize the circulatory system of the engine for this purpose, which may be done by means of the pipe connections as shown.

It may be understood that the importance and value of the means described for cooling the fitting arises from the fact that in order to obtain the quick action of the valve for limiting the transmission of the engine gas pressure past it, said valve is desirably, and in fact necessarily, of relatively large area and relatively thin and light in weight; and that being thus proportioned, and being exposed to the very high pressure which the engine gases exert in the compression stroke of the engine, said valve is formed, as shown, dished convex toward the pressure for stiffening it to resist the pressure; that if this valve thus thin and light were exposed to the full heat of the engine gases, which would quickly make it red hot, it would be thereby weakened, so that it would not withstand the gas pressures.

I claim:

1. A valve fitting and fluid connection for regulating communication of engine cylinder pressures, having a substantial portion of its body formed with a plurality of heat-radiating fins and the like, forming intervening channels for water circulation, and a sleeve and of the like encompassing said fin-bearing portions of the fitting for exteriorly closing the otherwise open sides of the channels, said sleeve having inlet and outlet connections for coupling to a water circulating system.

2. A valve fitting and fluid connection for limited communication from the cylinder of an internal combustion engine for a limited part of the pressure phase of the engine cycle, said fitting being arranged and adapted for mounting directly on a cylinder of the engine and comprising a valve chamber having inlet and outlet for fluid flow responsive to engine pressures; a valve positioned in the chamber adapted for being seated by the flow; means causing the valve to be normally off its seat stopped at a short distance therefrom with clearance around it for passage of the pressure gases; whereby the inertia of the valve and the resisting means momentarily delay the seating of the valve at the commencement of the flow and the gases pass by the valve during such delay.

3. In the construction defined in claim 2, the valve being in cup form with its cavity open toward the port of pressure communication with the engine cylinder, the seating face of the valve being at the outer side of the bottom of its cup form; whereby the pressure gases operate to build up fluid pressure rapidly at the side opposite its seat.

4. In combination with a valve for trapping engine pressures, means by which it is supported on and connected with the cylinder of the engine served, said supporting means having plurality of heat-radiating fins and the like forming intervening channels for water circulation, and a sleeve encompassing the fin-bearing portion of said supporting means for exteriorly closing the otherwise open sides of the channels, said sleeve having inlet and outlet connections for coupling to a water-circulating system.

In testimony whereof, I have hereunto set my hand at Long Island City, this 24 day of Feb., 1926.

EDWARD A. ROCKWELL.